United States Patent [19]
Mintz

[11] Patent Number: 5,999,860
[45] Date of Patent: Dec. 7, 1999

[54] METHOD AND APPARATUS FOR OPTIMIZING DIGITAL PROCESSING

[75] Inventor: Michael F. Mintz, Harraril, Mass.

[73] Assignee: ATI Technologies, Inc., Thornhill, Canada

[21] Appl. No.: 08/895,140

[22] Filed: Jul. 16, 1997

[51] Int. Cl.$^6$ .......................... G05B 19/042; G05B 19/05
[52] U.S. Cl. .............................................. 700/40; 712/226
[58] Field of Search ............................ 364/160; 395/567, 395/800.32, 500, 568, 500.03; 712/129

[56] References Cited

U.S. PATENT DOCUMENTS

| | | | |
|---|---|---|---|
| 3,577,190 | 5/1971 | Cocke et al. | 395/567 |
| 5,790,843 | 8/1998 | Borkenhagen et al. | 395/567 |
| 5,794,066 | 8/1998 | Dreyer et al. | 395/800.32 |

*Primary Examiner*—William Grant
*Assistant Examiner*—Kidest Bahta
*Attorney, Agent, or Firm*—Markison & Reckamp, PC

[57] ABSTRACT

A method and apparatus for optimizing digital processing in a computer system is accomplished when at least one of a plurality of digital processing operations (i.e., a set of programming instructions) receives a user request. The user request may include a request to execute the set of programming instructions and may further include data which would be operated upon by the digital processing operation. Upon receiving the request, the addressed digital processing operation (DPO) informs a controlling digital processing operation of the request, such that the controlling DPO may determine whether the addressed digital processing operation is of a first type. A first type digital processing operation is one that may produce a hang-up, an error, or is not optimized when executed alone or when executed in parallel with another digital processing operation. When the digital processing operation is of the first type, the controlling digital processing operation determines whether the addressed digital processing operation can be executed without alteration. Such a determination is based on whether the addressed digital processing operation will be executed individually or in parallel with others. When the addressed digital processing operation is not executable without alterations, the controlling digital processing operation selects at least one alternate digital processing operation (i.e., work around software) to be executed instead of the digital processing operation.

23 Claims, 5 Drawing Sheets

METHOD AND APPARATUS FOR OPTIMIZING DIGITAL PROCESSING

TECHNICAL FIELD OF THE INVENTION

This invention relates generally to processing digital information and more particularly to an optimized technique for processing digital information.

BACKGROUND OF THE INVENTION

Computers are known to include a central processing unit ("CPU"), memory, audio processing circuitry, video processing circuitry, and peripheral interfaces such that the computer may interface with a keyboard, printer, mouse, etc. The memory may be in a variety of forms; such as cache, hard drive, magnetic tape, floppy disk, RAM (Random Access Memory), ROM(Read Only Memory), CDROM (Cassette Disc Read Only Memory), etc. Such memory temporarily or permanently stores programming instructions, that when read by the CPU causes the CPU to manipulate digital information based on the programming instructions.

While the CPU is executing one set of programming instructions (E.g., for a particular application), the CPU may receive a request to execute another set of programming instructions (i.e., another application). If the CPU grants the request, it may be performing a plurality of applications simultaneously. The CPU may deny, or suspend, the request when parallel execution of the particular applications, or algorithms, have overlapping operations. For example, if each of the particular algorithms require the same registers to be dedicated thereto, the CPU must allocate the registers in a controlled manner. Without controlling access to these registers, the algorithms may not be executed properly. The CPU must further control the registers when the currently executing applications, or algorithms, generate interdependent data, i.e., the data generated by one application is needed by another application.

The CPU needs to further control the registers, and overall execution of applications, because of design flaws of newly released applications and/or newly released Application Specific Integrated Circuits (ASIC). The design flaws may be relatively minor causing the application, or the ASIC, to malfunction occasionally or may be somewhat severe causes the application, or the ASIC to hang up. To correct the flaws of new applications or ASICs, a system is expanded to include work around software. Work-around software is most predominately used for new ASIC releases and corrects deficiencies in the ASIC such that the desired performance is achieved.

While work around software overcomes the design flaws of newly released applications and/or ASICs, it does so with some cost to the overall efficiency of the computer system. The decrease in efficiency occurs because the core memory is expanded to include the work-around software, which slows access to the core memory. As is known, when the size of memory increases, especially for ROM, the accessing of such a memory slows, thereby slowing the overall efficiency of the system.

Therefore, a need exists for a method and apparatus that optimizes execution of digital processing operations.

DETAILED DESCRIPTION OF THE DRAWINGS

Generally, the present invention provides a method and apparatus for optimizing digital processing in a computer system. This may be accomplished when at least one of a plurality of digital processing operations (i.e., a set of programming instructions) receives a user request. The user request may include a request to execute the set of programming instructions and may further include data which would be operated upon by the digital processing operation. Upon receiving the request, the addressed digital processing operation (DPO) informs a controlling digital processing operation of the request, such that the controlling DPO may determine whether the addressed digital processing operation is of a first type. A first type digital processing operation is one that may produce a hang-up, an error, or is not optimized when executed alone or when executed in parallel with another digital processing operation.

When the digital processing operation is of the first type, the controlling digital processing operation determines whether the addressed digital processing operation can be executed without alteration. Such a determination is based on whether the addressed digital processing operation will be executed individually or in parallel with others. When the addressed digital processing operation is not executable without alterations, the controlling digital processing operation selects at least one alternate digital processing operation (i.e., work around software) to be executed instead of the digital processing operation. With such a method and apparatus, processing of digital information within a computer system can be optimized, especially when the altered digital processing operations are stored externally to the core memory which enables the core to operate at its optimal level. In addition, the controlling digital processing operation, which is stored in the core, controls other digital processing operations to ensure that errors, hang-ups or other adverse effects are avoided.

Figure 1:
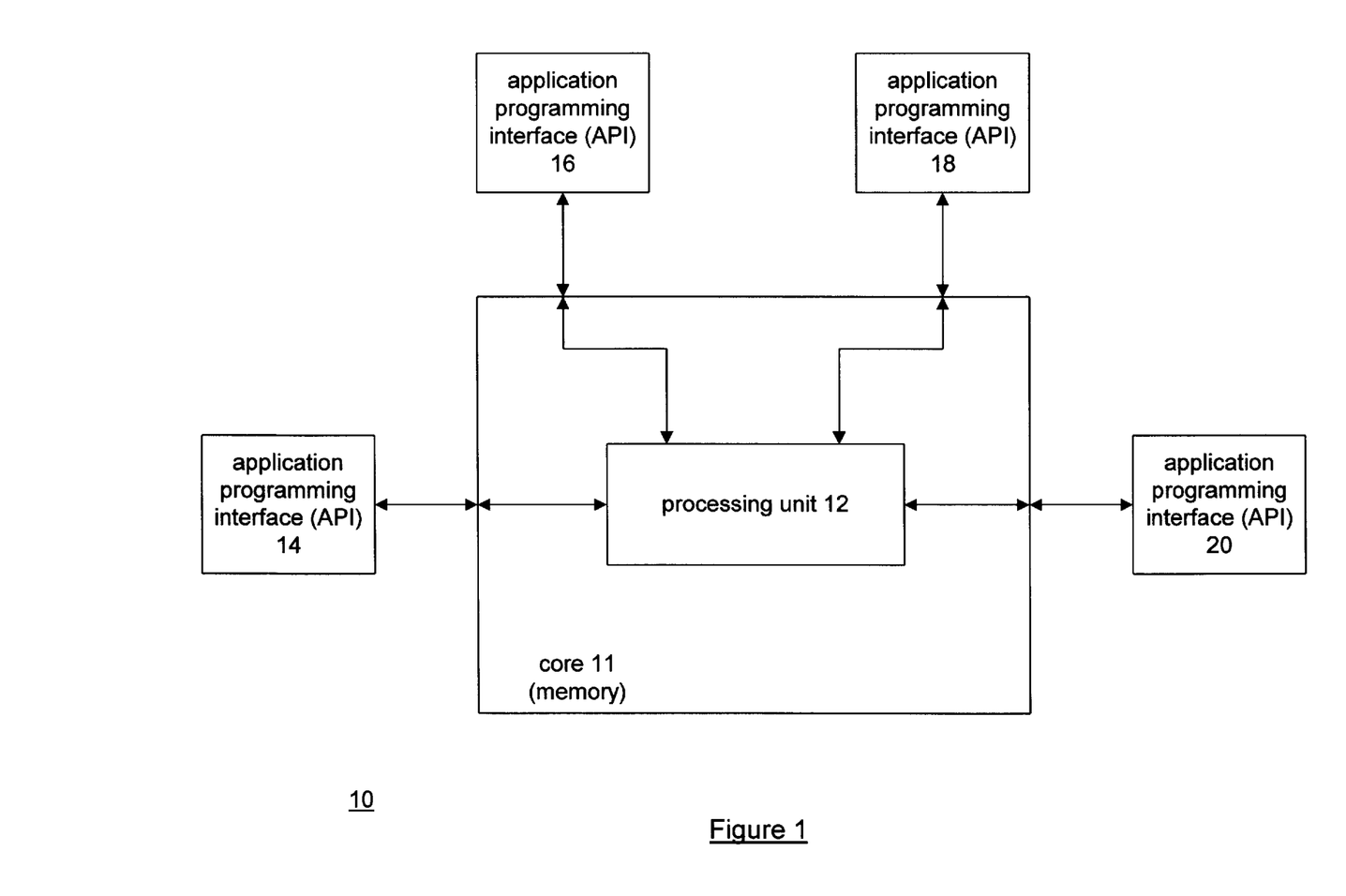
FIG. 1 illustrates a schematic block diagram of a system that is in accordance with the present invention.

The present invention can be more fully described with reference to FIGS. 1 through 6. FIG. 1 illustrates a schematic block diagram of a computer system 10 that includes a processing unit 12, core memory 11, and a plurality of application programming interfaces ("API") 14–20. The processing unit 12 may be an Application Specific Integrated Circuit (ASIC), such as a video graphics processor, microprocessor, digital signal processor, micro-controller, or any ASIC that manipulates digital information based on programming instructions. The core memory 11 may be a read-only memory, RAM, hard drive, CD ROM, or any other type of means for storing digital information. Typically, the core memory will store digital processing operations (E.g., particular applications) and the controlling digital processing operation.

The applications, or digital processing operations, stored by the core memory 11 are typically evoked by a user via a user request that is received by one of the application programming interfaces 14–20. The API's 14–20 may be a RAVE interface (an Apple-based interface), a direct X (a Microsoft-based interface), an open GL interface, or a video graphics interface.

In operation, any of the API's 14–20 may receive a user request which includes a request for execution of a particular application, or digital processing operation, and data that the particular application is to execute upon. Having received the user request, the application interface provides it to the processing unit 12 which evokes the addressed applications (i.e., the digital processing operations) from the core memory 11. When the system 10 is operating properly, the processing unit 12 will perform the application as requested by the user without an error, a hang-up, or adverse effects one the application. But, when the processing unit 12 is a new ASIC, which may include design flaws, corrective measures need to be taken. As such, work around software that corrects, repairs, and/or optimizes design flaws of the ASIC and/or application is included in the computer system. In addition, a controlling digital processing operation is included to control execution of the work-around software, to control execution of the digital processing operations, and to prioritize user requests when such requests are incompatible with currently executing applications.

Figure 2:
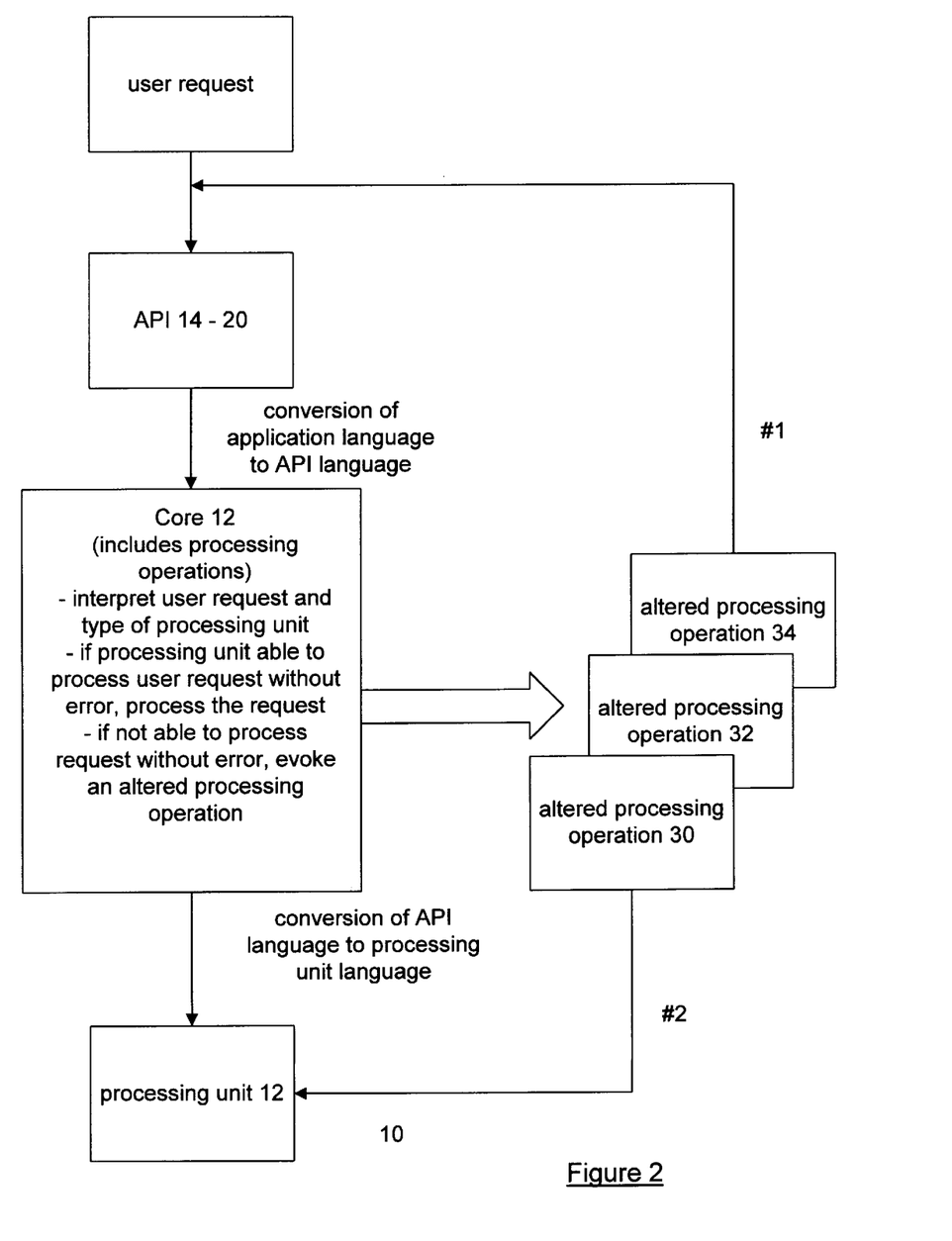
FIG. 2 illustrates a graphical representation of processing flow in the system of FIG. 1.

FIG. 2 illustrates the processing of a user request in the system 10. The user request is received by one of the API's 14–20 which converts the user requests into an API language. The particular API language is dependent on the type of API being incorporated as is generally understood in the art. The converted API language is then provided to the core memory 11, which stores the digital processing operations, or applications, and the controlling digital processing operation.

Upon receiving the API language converted user request by a digital processing operation (i.e., the addressed digital processing operation), it informs the controlling digital processing operation of the request. The controlling digital processing operation interprets the user request, the type of the processing unit, and the identity of the addressed digital processing operation. The type of processing unit may include various revision levels of the ASIC, various feature sets, or any other differing characteristics of the particular processing unit. For example, if the processing unit is a video graphics chip, such as those produced by ATI Technologies, the type of the processing unit may be a RAGE 1, RAGE 2, RAGE 2X, RAGE LT1, RAGE LT2, RAGE 3, RAGE LT3, or RAGE 2C. Each of these video graphics processing chips have different performance characteristics, which the controlling digital processing operation needs to determine such that it may determine whether the particular request can be performed by the particular processing unit 12.

If the processing unit is able to optimally process the user request without error, the controlling processing operation passes the request to the processing unit 12. This is done by converting the API language to a processing unit language, which is generally understood in the art. Once the processing unit 12 has obtained the user requests, which again includes a request for execution of a particular application and the data to be manipulated, the processing unit executes the addressed digital processing operation upon the data.

If, however, the processing unit is not able to process the request without error or the process is not optimal, the controlling digital processing operation evokes an altered processing operation, or work-around software. Note that the alternate digital processing operation may entirely replace the addressed digital processing operation or a portion thereof. Further note that an error may result in the corruption of the data, an incompatibility with a currently executed digital processing operation, or the addressed digital processing operation would produce a hang-up condition. For example, if the processing unit 12 is a video graphics processor, the error condition may be poor visual quality, the ability to do an optimization, or a resulting hang-up condition.

When the controlling digital processing operation evokes an altered processing operation 30, 32, 34, the request to evoke the particular altered processing operation is routed to the particular API 14–20. The API treats the altered digital processing operation as a new user request and provides an API converted language representation thereof to the controlling digital processing operation. Upon receipt, the controlling digital processing operation performs the previously discussed operations to determine whether the altered digital processing operation can be executed error free. Once the controlling processing operations determines that the altered processing operation can be executed without error, the altered processing operation is executed by the processing unit 12. Note that the altered processing operations 30, 32 and 34 are separately stored from the core memory 11. This enables the core memory 11 to store only the digital processing operations and not the fixes, i.e., the work around software, which may change several times to correct for repairs, optimizations and/or to add enhancements to the system. When the core memory is used more efficiently, the overall efficiency of the system 10 is improved.

For example, if the processing unit 12 is a video graphics circuit, an incompatibility exists between a fog application, or fog digital processing operation, and an alpha-blending application. As is generally understood, alpha-blending imposes a translucent quality to a particular image. The fog application provides a translucent overlay of a particular image. As such, both the alpha-blending and fog application cannot be done simultaneously due to their similar affects on a scene. Thus, the fog application is typically evoked when both have been requested.

Figure 3:
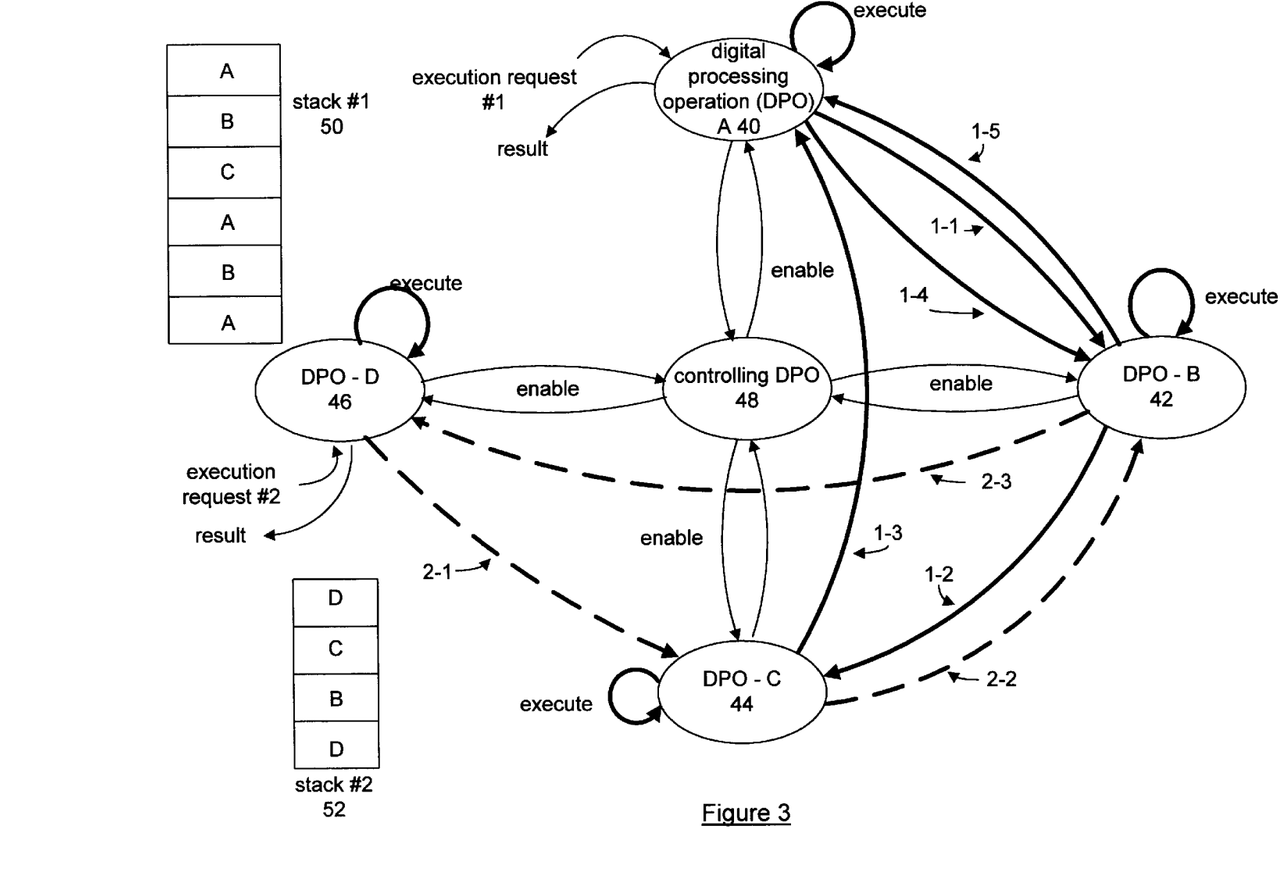
FIG. 3 illustrates a state diagram which is in accordance with the present invention.

FIG. 3 illustrates a state diagram of two user requests being processed simultaneously. As shown, a plurality of digital processing operations ("DPO") A, B, C, D, and E, a controlling DPO 48 are involved in at least one of the two processes. The figure also depicts a first stack 50 and a second stack 52, which are used to keep track of the respective processes. In operation, digital processing operation A receives execution request number 1 from any of the APIs. Upon receiving this request, the DPO 40 provides an enable request to the controlling DPO 48. The enabling request identifies the particular DPO and the particular type of request. To determine whether to enable the DPO 40, the controlling DPO 48 includes a list of problem conditions, the DPOs that are of the first type, and the associated work-around software (i.e., altered digital processing operations).

In addition, the controlling DPO 48, upon receiving the enable request from DPO A, identifies each of the DPOs involved in the operation and may enable them all at the same time, or when individually addressed. Assuming that DPO A does not have a conflict and is thus capable of performing the user requests, the controlling DPO enables the digital processing operation 40. Such enablement allows the digital processing operation A to execute its programming instructions. Having executed its programming instructions upon the data of the execution request #1, the manipulated data is provided to the DPO B for its execution. If, the controlling DPO had enabled all of the DPOs involved in the particular process at the beginning of the process, DPO B would execute its particular programming instructions. If, however, the controlling DPO 48 did not enable all of the DPOs at the beginning of the process, upon receiving the data from DPO A, DPO B would send an enabling request to the controlling DPO 48. Upon receiving enablement, DPO B would execute its programming instructions upon the data received from DPO A. This process would continue following the 1–2, 1–3, 1–4, and 1–5 paths.

To assist in the controlling of the DPOs, the controlling DPO controls the first stack 50. As such, as each DPO is addressed, the first stack, which may be a first in last out buffer, is updated. As shown, the stack includes the list of DPOs that are accessed during this particular request and are stored in the order of execution.

FIG. 3 also shows a second process which is initiated via execution request #2. DPO D receives the second execution request and provides an indication thereof to the controlling DPO 48 which determines whether this particular request can be executed without error while the first request is being executed. Also, the controlling DPO 48 may enable each of the DPOs involved in the process simultaneously, or when addressed by another DPO.

As shown, the processing flow follows the path of 2-1, 2-2, and 2-3. Also shown is the second stack 52 which is updated by the controlling DPO as information is being manipulated by the respective DPOs. As one skill in the art would readily appreciate, the first and second stacks 50 and 52 ensure that the logic flow of the execution of the DPOs are done in the order prescribed by the particular request. Note that more DPOs may be involved in the processes and the flow paths could be different depending on the operation being performed.

Figure 4:
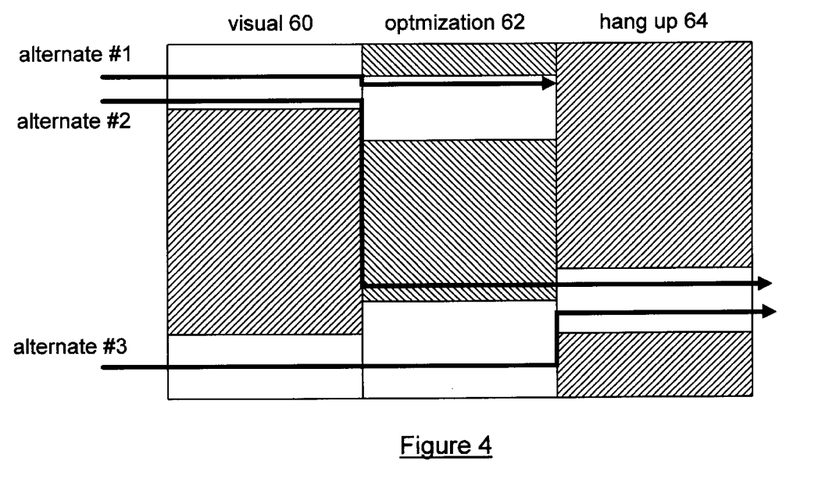
FIG. 4 illustrates a graphical representation of alterations to a digital processing operation which is in accordance with the present invention.

FIG. 4 illustrates a graphical representation for a video graphics circuit wherein an altered digital processing operation is involved. As shown, the graphical representation includes a column for visual effects 60, optimizations 62, and hang-up conditions 64. The cross-sectioned areas in each of the columns represents particular alterations that would produce a corresponding error. The clear portions of the column represents altered processing operations that would not produce an error. For an altered processing operations to be selected, the particular path has to be able to flow from the left side of the diagram to the right side without encountering an error condition. As shown, alternative 1 is shown to utilize the particular alternate digital processing operation of the visual effects 60 and the optimization effects 62. But there is not a clear connection to an alternate digital processing operation in the corresponding hang-up column 64. As such, alternate 1 is not usable by the particular processing unit and the particular unit would have to wait until the particular condition that is causing the error condition, which has placed the DOP in a first state, is removed.

Alternate 2 utilizes the first portion of the visual column as the alternate digital processing operation, and passes through the optimization column to the altered digital processing operations for the hang-ups 64. As one skilled in the art would readily appreciate, the altered digital processing operations for optimization are an option. As such, if a path between the visual altered digital processing operation and a hang-up altered processing operation exists, the controlling digital processing operation may evoke such altered digital processing operations.

The third alternative is shown to utilize the altered digital processing operations of the visual effects, the optimizations, and hang-up conditions which are all compatible. Note that the visual effects and the optimization DPO are performed in any order followed by the execution of the hang-up DPO. As such, the processing unit may be altered utilizing these three different altered processing operations to perform the user requests.

Figure 5:
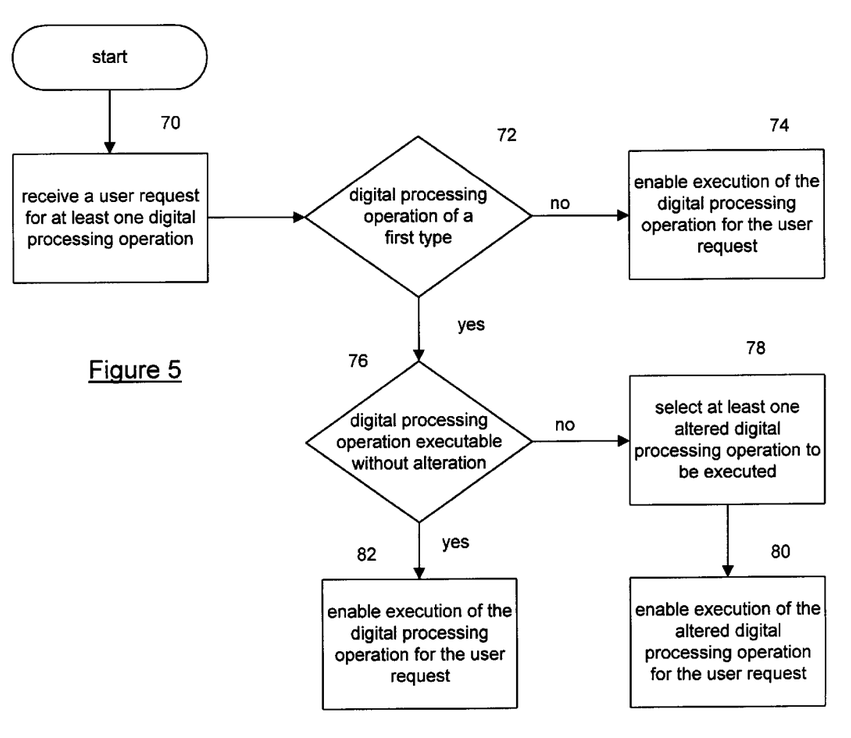
FIG. 5 illustrates a logic diagram that may be used to optimized digital processing in accordance with the present invention.

FIG. 5 illustrates a logic diagram for optimizing digital processing in a system The process begins at step 70 where a user request is received for at least one digital processing operation, which may be programmed using C++ language™. The process then proceeds to step 72 where a determination is made as to whether the digital processing operation is of a first type. A digital processing operation is of the first type when it has certain operational limitations. Such limitations include the potential for producing a hang-up condition, an adverse visual effect condition (for video graphics processing), is not optimized, or any other type of error, either operating alone, or in parallel operation with another digital processing operation. If the digital processing operation is not of the first type, the process proceeds to step 74 where the digital processing operation is enabled to execute the user request. As previously mentioned, the user request includes data to be manipulated and/or a request for execution.

If, however, the digital processing operation is of the first type, the process proceeds to step 76. At step 76, a determination is made as to whether the digital processing operation is executable without alterations. A digital processing operation is executable without alterations when operating alone, it does not produce an error but may when operating in conjunction with another. Thus, if this particular digital processing operation is the only operation being performed, it can be done so without alteration. As such, the process proceeds to step 82 where the digital processing operation is enabled to execute the user request.

If, however, the digital processing operation is not executable without alteration, the process proceeds to step 78. At step 78, at least one altered digital processing operation is selected to be executed in place of the desired digital processing operation or a portion thereof. The altered digital processing operation will substantially fulfill the user requirements, while doing so in an error free manner. The process then proceeds to step 80 where the altered digital processing operation is enabled to execute the user requests.

Figure 6:
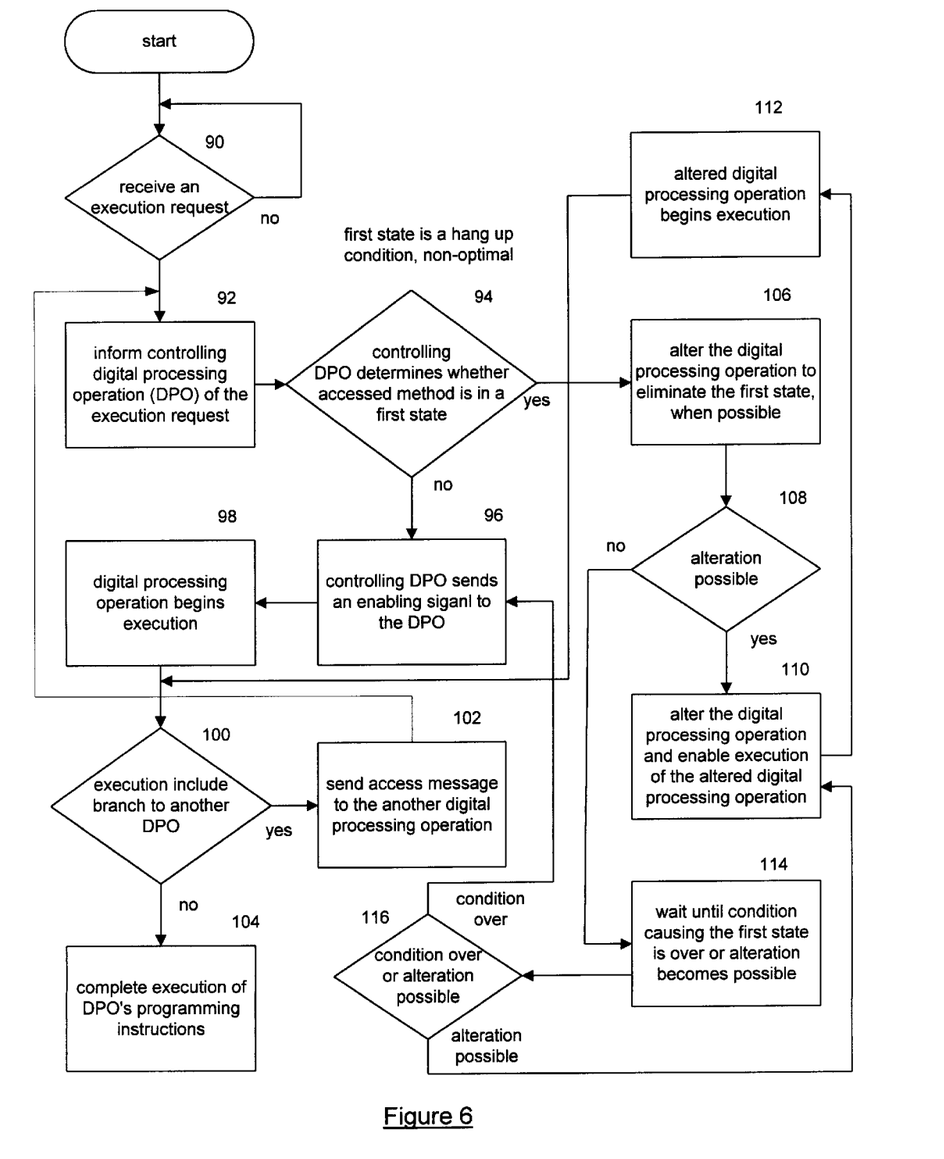
FIG. 6 illustrates a logic diagram which may be used to optimized digital processing which is in accordance with the present invention.

FIG. 6 illustrates a logic diagram for optimizing digital processing within a system. The process begins at step 90 where a determination is made as to whether an execution request has been received. Once the request has been received, the process proceeds to step 92 where a digital processing operation informs a controlling digital processing operation that it has received an execution request. Note that a digital processing operation is in a disabled mode unless enabled by the controlling digital processing operation. As such, when any of the digital processing operations receive an execution request, it cannot act upon it without first being enabled by the controlling digital processing operation.

Having informed the controlling digital processing operation, the process proceeds to step 94 where a determination is made as to whether the addressed digital processing operation is in a first state. As previously mentioned, a digital processing operation may be in a first state when its stand-alone execution would produce an error such as being non-optimal, or, when the digital processing operation is being executed in parallel with another digital processing operation, it produces an error condition such as a hang-up, is non-optimal, or would produce some other error.

If the addressed digital processing operation is not in a first state, the process proceeds to step 96 where the controlling digital processing operation sends an enabling signal to the addressed digital processing operation. Next, the process proceeds to step 98 where the digital processing operation begins its execution. The process then proceeds to step 100 where a determination is made as to whether the execution of the digital processing operation includes a branch to another digital processing operation. If not, the digital processing operation completes its execution and supplies the results back to the appropriate application program interface.

If, however, the execution of the digital processing operation includes a branch to another digital processing operation, the process proceeds to step 102. At step 102, the addressed digital processing operation sends an execution request to the other digital processing operation. Having done this, the other digital processing operation performs the process beginning at step 92. This nesting, or recursion, of digital processing operations continues until the user request, or execution request, has been completely satisfied. Note that while nesting of digital processing operations is being performed, the controlling digital processing operation updates a stack to monitor such nesting.

If, at step 94, the controlling digital processing operation determine that the addressed DPO is in the first state, the process proceeds to step 106. At step 106, the digital processing operation, when possible, is altered, or an altered digital processing operation is selected. The process then proceeds to step 108, where a determination is made as to whether the alteration was possible. If so, the process proceeds to step 110 where the digital processing operation is altered, or one of the alternate digital processing operations is selected. In addition, execution of the altered digital processing operation is enabled. Having done this, the process proceeds to step 112 where the altered digital processing operation begins execution. While executing, the altered digital processing operation proceeds to step 100 where it makes a determination as to whether it has a nested digital processing operation. Such nesting, or recursion, was previously discussed in the preceding paragraph.

If, however, alterations to the digital processing operation are not available, the process proceeds to step 114. At step 114, the process waits until the condition causing the first state is over or an alteration becomes possible. As previously mentioned, the addressed digital processing operation may be in the first state due to the fact that it cannot simultaneously or contemporaneously be executed with another digital processing operation. As such, the other digital processing operation may have been selected first, or has a higher priority, and, once it is completed, the addressed digital processing operation may begin execution.

The process then proceeds to step 116 where a determination is made as to whether the condition is over or an alteration is possible. If the condition is over, the process proceeds to step 96 where the controlling digital processing operation enables the addressed digital processing operation. If, however, an alteration has become possible, the process proceeds to step 110 where the digital processing operation is altered or an altered digital processing operation is selected.

The preceding discussion has presented a method and apparatus for optimizing the processing of digital information in a computer system. This is accomplished by providing alternate digital processing operations, or work-around software, as a separate entity from the core memory. Thus, when a new ASIC is incorporated into the system, the core memory will include the particular long-term applications while the altered processing operations will be included in the work-around software. As such, the core memory can be optimized thereby improving the overall efficiency of the computer system

What is claimed is:

1. A method for optimizing digital processing, the method comprising the steps of:
   a) receiving a user request for at least one digital processing operation;
   b) determining whether the at least one digital processing operation is of a first type;
   c) when the at least one digital processing operation is of the first type, providing the at least one digital processing operation to an operational object;
   d) determining, by the operational object, whether the at least one digital processing operation is executable without alteration; and
   e) when the at least one digital processing operation is not executable without alteration, altering, by the operational object, the at least one digital processing operation to produce at least one altered digital processing operation.

2. The method of claim 1 further comprises, within step (a), receiving the user request for a video graphics operation, wherein the video graphics operation is fog.

3. The method of claim 1 further comprises, within step (b), determining the at least one digital processing operation is of the first type when execution of the at least one digital processing operation would produce a hang condition.

4. The method of claim 1 further comprises, within step (b), determining that the at least one digital processing operation is of the first type when execution of the at least one digital processing operation is non-optimal.

5. The method of claim 1 further comprises, within step (b),
   executing, as part of the operational object, a visual object to detect visual corruption;
   executing, as part of the operational object, a hang-condition object to determine whether execution of the at least one digital processing object would produce a hang condition; and
   executing, as part of the operational object, an optimizing object to determine whether execution of the at least one digital processing object can be optimized.

6. The method of claim 1 further comprises, within step (e), altering the digital processing operation by at least one of: temporarily prohibiting execution, approximating attributes of the at least one digital processing operation, processing data communication with at least one digital processing operation in an alternate manner.

7. The method of claim 1 further comprises, within step (a), receiving the user request for a video graphics operation, wherein the video graphics operation is alpha blending.

8. The method of claim 1 further comprises, within step (b), determining the at least one digital processing operation is of the first type when execution of the at least one digital processing operation would produce a visual corruption.

9. The method of claim 1, wherein the step d) further includes the determination being based on whether the addressed digital processing operation will be executed individually or in parallel with others.

10. A method for a controlling operation to control execution of a plurality of processing operations, the method comprising the steps of:

a) receiving an indication of an execution request from one of the plurality of processing operations while the one of the plurality of processing operations is in a disabled mode;

b) determining whether current execution of the one of the plurality of processing operations would produce an error;

c) when current execution of the one of the plurality of processing operations would produce an error, determining whether the one of the plurality of processing operations could be altered to eliminate the error; and d) when the one of the plurality of processing operations can be altered to eliminate the error, altering the one of the plurality of processing operations to produce an altered one of the plurality of processing operations.

11. The method of claim 10 further comprises enabling execution of the one of the plurality of processing operations when the current execution of the one of the plurality of processing operations would not produce the error.

12. The method of claim 10 further comprises enabling execution of the altered one of the plurality of processing operations.

13. A method for executing a plurality of processing operations, the method comprising the steps of:

a) while in a disabled mode, receiving, by one of the plurality of processing operations, an execution request;

b) providing, by the one of the plurality of processing operations, the execution request to a controlling processing operation;

c) determining, by the controlling processing operation, whether the plurality of processing operations can perform the execution request without error; and d) when the plurality of operations can perform the execution request without error, enabling, by the controlling processing operation, execution of the plurality of processing operations based on the execution request.

14. The method of claim 13 further comprises, when the plurality of processing operations cannot perform the execution request without error, identifying, by the controlling processing operation, at least one of the plurality of processing operations as a cause for the error;

determining, by the controlling processing operation, whether the at lest one of the plurality of processing operations can be altered to eliminate the error; and when the at least one of the plurality of processing operations can be altered to eliminate the error, altering, by the controlling processing operation, the at least one of the plurality of processing operations.

15. A processing circuit comprising:

a processing unit; and memory operably coupled to the processing unit, wherein the memory stores programming instructions that, when read by the processing unit, causes the processing unit to (a) receive a user request for at least one digital processing operation; (b) determine whether the at least one digital processing operation is of a first type; (c) provide the at least one digital processing operation to an operational object when the at least one digital processing operation is of the first type; (d)determine whether the at least one digital processing operation is executable without alteration; and (e) alter the at least one digital processing operation to produce at least one altered digital processing operation when the at least one digital processing operation is not executable without alteration.

16. The processing circuit of claim 15 further comprises, within the memory, programming instructions that, when read by the processing unit, causes the processing unit to determine the at least one digital processing operation is of the first type when execution of the at least one digital processing operation would produce at least one of: a hang condition and visual corruption.

17. The processing circuit of claim 15 further comprises, within the memory, programming instructions that, when read by the processing unit, causes the processing unit to determine that the at least one digital processing operation is of the first type when execution of the at least one digital processing operation is non-optimal.

18. The processing circuit of claim 15 further comprises, within the memory, programming instructions that, when read by the processing unit, causes the processing unit to (i) execute a visual object to detect visual corruption; (ii) execute a hang-condition object to determine whether execution of the at least one digital processing object would produce a hang condition; and (iii) execute an optimizing object to determine whether execution of the at least one digital processing object can be optimized.

19. A processing circuit comprising:

a processing unit; and memory operably coupled to the processing unit, wherein the memory stores programming instructions that, when read by the processing unit, causes the processing unit to (a) receive an indication of an execution request from one of the plurality of processing operations while the one of the plurality of processing operations is in a disabled mode; (b) determine whether current execution of the one of the plurality of processing operations would produce an error; (c) determine whether the one of the plurality of processing operations could be altered to eliminate the error when current execution of the one of the plurality of processing operations would produce an error; and (d) alter the one of the plurality of processing operations to produce an altered one of the plurality of processing operations when the one of the plurality of processing operations can be altered to eliminate the error.

20. The processing circuit of claim 19 further comprises, within the memory, programming instructions that, when read by the processing unit, causes the processing unit to enable execution of the one of the plurality of processing operations when the current execution of the one of the plurality of processing operations would not produce the error.

21. The processing circuit of claim 19 further comprises, within the memory, programming instructions that, when read by the processing unit, causes the processing unit to enable execution of the altered one of the plurality of processing operations.

22. The processing circuit of claim 19 further comprises, within the memory, programming instructions that, when read by the processing unit, causes the processing unit to (i) identify at least one of the plurality of processing operations as a cause for the error; (ii) determine whether the at lest one of the plurality of processing operations can be altered to eliminate the error; and (iii) alter the at least one of the plurality of processing operations when the at least one of the plurality of processing operations can be altered to eliminate the error.

23. A processing circuit comprising:

a processing unit; and memory operably coupled to the processing unit, wherein the memory stores programming instructions that, when read by the processing unit, causes the processing unit to (a) receive, from one of plurality of processing operations, an execution request to a controlling processing operation, wherein the one of the plurality of processing operations is in a disabled mode; (b) determine whether the plurality of processing operations can perform the execution request without error; and (c), enable execution of the plurality of processing operations based on the execution request when the plurality of operations can perform the execution request without error.

* * * * *